3,324,059
RESINS FROM HYDROXYPHENYLSTEARIC ACID
Frank Scholnick, Lafayette Hill, Harry A. Monroe, Jr., North Wales, Arthur N. Wrigley, Oreland, and Waldo C. Ault, Glenside, Pa., assignors to the United States of America as represented by the Secretary of Agriculture
No Drawing. Filed Mar. 17, 1964, Ser. No. 352,691
5 Claims. (Cl. 260—19)

A non-exclusive, irrevocable, royalty-free license in the invention herein described, throughout the world for all purposes of the United States Government, with the power to grant sublicenses for such purposes, is hereby granted to the Government of the United States of America.

This invention relates to new compositions of matter. More particularly, the invention relates to condensation products of formaldehyde and hydroxyphenylstearic acid and the compositions obtained by reaction of the condensation products with epoxy resins.

The compositions are useful in the manufacture of adhesives, coatings, films and cast articles.

According to the present invention, formaldehyde and hydroxyphenylstearic acid are combined in at least about at 2–1 mole ratio, respectively, and heated in the presence of a catalyst until the reaction is substantially complete. The catalyst may be alkaline or acidic and the reaction is preferably conducted in an inert atmosphere such as nitrogen. After the condensation reaction is substantially complete, the resin is separated from the reaction mixture. These resins have average molecular weights of about 900–1000, corresponding to two to three phenolic units per molecule, hydroxy functions of about 4.5 to 5.0 percent, and are readily soluble in alcohols.

The resins from the condensation reaction have adhesive properties, films remaining soft and tacky even after baking at 200° C.

In a preferred embodiment of the invention, however, the resin products are heated and stirred with an epoxy resin and a trace of alkaline catalyst in a solvent inert to the resin reactants until a clear solution is obtained, which upon curing forms hard, flexible and chemically resistant films and other cast articles.

Hydroxyphenylstearic acid is readily available from the addition of phenol to oleic acid employing methanesulfonic acid as the catalyst-solvent medium. Alternatively, methyl oleate may be used as a starting material instead of oleic acid, the methyl hydroxyphenylstearate separated from the quenched reaction mixture with a solvent such as toluene, the washed and dried solvent solution distilled to recover methyl hydroxyphenylstearate (B.P. 248–260° at 2 mm. mercury pressure) and the ester saponified to give hydroxyphenylstearic acid.

The catalyst for the formaldehyde-hydroxyphenylstearic acid reaction may be either alkaline, such as sodium, potassium or ammonium hydroxides, or one of the organic bases, or acidic, any proton donor, either organic acids such as oxalic, acetic, propionic, etc., or mineral acids such as hydrochloric, phosphoric and sulfuric.

While higher temperatures may be employed to speed up the reaction of hydroxyphenylstearic acid and formaldehyde, the reaction proceeds satisfactorily at the reflux temperature of the aqueous solution. Somewhat lower temperatures may be employed, but the reaction then requires considerably longer periods of time. Ratios of more than two moles formaldehyde to one of hydroxyphenylstearic acid may be used, but appear to have no advantage in introducing additional functional groups. Lower ratios of formaldehyde to hydroxyphenylstearic acid may be used to produce resins, leading to lower hydroxy content in the product.

Although the formaldehyde-hydroxyphenylstearic acid resins described in the examples had average molecular weights of about 900 to 1000, it is considered obvious that the mixture contained both higher and lower molecular weight species.

Epoxy resins are commonly prepared as the condensation product of bisphenol A (bis(4-hydroxyphenyl)dimethylmethane) and epichlorohydrin. Preferred resins for blending with the formaldehyde-hydroxyphenylstearic acid resin in the present process are commercial epoxy resins having an epoxide equivalent of about 400–2000.

The ratios of epoxy resin combined with the new resin to produce the hard, flexible products may be varied over a considerable range. A preferred range is from about equal parts by weight to a ratio of about 3 parts epoxy resin to one part formaldehyde-hydroxyphenylstearic acid resin, the products of optimum hardness and chemical resistance falling within this range. Since the epoxy resin is the more expensive component, it is desirable to use the least amount of epoxy resin that will give a product with required physical and chemical characteristics.

The two resins are blended by heating in a solvent or solvent mixture which does not react with the resins. Particularly effective for these resins is a mixture of xylene and butylcellosolve, although other solvents or combinations of solvents may be employed. An alkaline catalyst such as benzyldimethylamine is included in the reaction mixture. It is important that complete solution and blending of the resins is achieved, as indicated by obtaining a clear solution. If this is not done the cured product will have distortions or other imperfections.

Examples are presented in illustration of the process of the present invention but are not intended to be in limitation thereof. In the examples, 1 and 2 demonstrate the preparation of formaldehyde-hydroxyphenylstearic acid resins and Examples 3 and 4 describe the preparation of resins from the reaction of the products of Examples 1 and 2 with a commercial epoxy resin.

*Example 1*

A mixture of 15.1 g. (0.04 mole) of hydroxyphenylstearic acid, 6.5 g. of 37% formaldehyde (0.08 mole), and 0.032 g. (0.0008 mole) of sodium hydroxide was heated at reflux temperature with stirring under a nitrogen atmosphere. After 48 hours the mixture was cooled and extracted with ether. The ether extract was acidified with dilute (10%) hydrochloric acid, then washed with water until neutral and dried over magnesium sulfate. The ether was removed to give a product having the following analysis: Iodine No. 55.6, —OH (percent by weight) 4.77, and an average molecular weight of 923.

*Example 2*

A mixture of 15.1 g. (0.04 mole) of hydroxyphenylstearic acid, 6.5 g. of 37% formaldehyde (0.08 mole) and 0.05 g. (0.0004 mole) of oxalic acid dihydrate was combined and stirred at reflux temperature under an atmosphere of nitrogen. After 24 hours reflux, an additional 0.05 g. of the acid catalyst was added and the heating and stirring continued for another 24 hours. The product was separated as in Example 1 and had the following analysis: Iodine No. 42.6, —OH (percent by weight) 4.79, and an average molecular weight of 1006.

The products of Example 1 and Example 2 were readily soluble in alcohols. Films were cast from alcohol solution. The films remained soft and tacky even after baking at 200° C.

*Example 3*

A solution was made of 1.08 g. of the product of Example 1 in 5.4 g. of a solvent mixture consisting of one part by weight xylene and two parts by weight butyl-cellosolve. In another 5.4 g. solvent mixture was added 2.52 g. of an epoxy resin having an epoxide equivalent in the range of 1600–2000. The solutions were combined, 2 drops of benzyldimethylamine added, and the mixture heated on a steam bath for 1 hour to insure complete miscibility. The clear solution was applied to 4″ x 6″ phosphate treated steel panels using a 3-mil film applicator. The panels were baked at 294° C. (400° F.) for 30 minutes. Properties of the films were determined.

*Example 4*

The procedures of Example 3 were repeated using the product of Example 2 for combining with the epoxy resin.

The films prepared in Examples 3 and 4 were tested for flexibility, hardness and resistance to solvents.

Flexibility was studied using the conical mandrel bend test with a ⅛″ mandrel. All of the films passed this test. This property of flexibility is foreign to unsubstituted phenol-formaldehyde resins and is considered in this instance to be due to the long fatty acid chains.

Hardness tests gave Sward rocker values of 50 or higher.

The films show excellent chemical resistance. In tests maintained for over 5 months the films have not been affected by solvents such as benzene or acetone or by 5% aqueous sodium hydroxide.

We claim:

1. A process for preparing a resinous composition comprising heating an aqueous solution consisting essentially of water, formaldehyde and hydroxyphenylstearic acid, the latter two in at least about a two to one mole ratio, respectively, in the presence of a catalyst selected from the group consisting of alkaline and acidic catalysts, for about 48 hours, under a nitrogen atmosphere, and at the refluxing temperature of the aqueous solution, thereby to obtain a formaldehyde-hydroxyphenylstearic acid resin having an average molecular weight of about from 900 to 1000, and separating said resin from the reaction mixture.

2. The process of claim 1 in which the catalyst is an alkaline catalyst.

3. The process of claim 2 in which the alkaline catalyst is sodium hydroxide.

4. The process of claim 1 in which the catalyst is an acidic catalyst.

5. The process of claim 4 in which the acidic catalyst is oxalic acid dihydrate.

References Cited

UNITED STATES PATENTS

| | | | |
|---|---|---|---|
| 2,082,459 | 1/1937 | Niederl | 260—19 |
| 2,249,460 | 7/1941 | D'Alelio | 260—19 |
| 3,031,421 | 4/1962 | Boyer et al. | 260—19 |
| 3,108,978 | 10/1963 | McNaughtan | 260—19 |
| 3,218,370 | 11/1965 | Fry et al. | 260—831 |

OTHER REFERENCES

Lee et al., Epoxy Resins, 1957, pages 17, 270, 274, and 278 relied upon.

Megson, Phenolic Resin Chemistry, 1958, pages 206, 248 and 220 relied upon.

Handbook of Chemistry and Physics, 38th edition, published by Chemical Rubber Publishing Co., 1956, pages 1068–1069.

DONALD E. CZAJA, *Primary Examiner.*

LEON J. BERCOVITZ, *Examiner.*

F. McKELVEY, *Assistant Examiner.*